(12) United States Patent
Maeda et al.

(10) Patent No.: US 10,107,181 B2
(45) Date of Patent: Oct. 23, 2018

(54) INTERNAL COMBUSTION ENGINE

(71) Applicants: TOYOTA JIDOSHA KABUSHIKI KAISHA, Toyota-shi, Aichi-ken (JP); AISIN TAKAOKA CO., LTD., Toyota-shi, Aichi-ken (JP)

(72) Inventors: Osamu Maeda, Toyota (JP); Tatsuo Iida, Anjo (JP); Koichi Yonezawa, Toyota (JP); Tomoya Kato, Toyota (JP)

(73) Assignees: TOYOTA JIDOSHA KABUSHIKI KAISHA, Toyota (JP); AISIN TAKAOKA CO., LTD., Toyota (JP)

( * ) Notice: Subject to any disclaimer, the term of this patent is extended or adjusted under 35 U.S.C. 154(b) by 75 days.

(21) Appl. No.: 15/312,553

(22) PCT Filed: May 15, 2015

(86) PCT No.: PCT/IB2015/000692
§ 371 (c)(1),
(2) Date: Nov. 18, 2016

(87) PCT Pub. No.: WO2015/177618
PCT Pub. Date: Nov. 26, 2015

(65) Prior Publication Data
US 2017/0114712 A1    Apr. 27, 2017

(30) Foreign Application Priority Data
May 20, 2014 (JP) .................. 2014-104089

(51) Int. Cl.
F02B 37/02       (2006.01)
F01N 13/08       (2010.01)
(Continued)

(52) U.S. Cl.
CPC .............. *F02B 37/02* (2013.01); *F01N 13/08* (2013.01); *F01N 13/1805* (2013.01);
(Continued)

(58) Field of Classification Search
CPC . F02B 37/02; F02F 1/4264; F02F 1/40; F02F 1/243; F01N 13/1805; F01N 13/105
(Continued)

(56) References Cited

U.S. PATENT DOCUMENTS

2011/0041498 A1 * 2/2011 Kuhlbach ............... F02B 37/02
                                                                  60/613
2012/0090320 A1 * 4/2012 Kuhlbach ............... F01N 13/10
                                                                  60/611
(Continued)

FOREIGN PATENT DOCUMENTS

DE      102007057310 A1 *  6/2009  ........... F01N 13/107
DE      102008035957 A1 *  2/2010  ............ F01M 11/02
(Continued)

Primary Examiner — Jason Newton
(74) Attorney, Agent, or Firm — Oliff PLC

(57) ABSTRACT

An internal combustion engine includes: a cylinder block including multiple cylinders; a cylinder head; and a turbocharger including an inlet port connected to an exhaust outlet of the cylinder head. The inlet port includes a first wall portion located between one cylinder out of the two outermost cylinders and the central axis of the inlet port in the cylinder array direction, and a second wall portion located on the opposite side of the central axis of the inlet port from the first wall portion. The first wall portion includes a thick-walled portion that is greater in thickness than the second wall portion, and a thin-walled portion that is smaller in thickness than the thick-walled portion and is located upstream of the thick-walled portion in the direction of exhaust gas flow.

5 Claims, 3 Drawing Sheets

(51) Int. Cl.
*F01N 13/18* (2010.01)
*F02B 67/10* (2006.01)
*F02F 1/40* (2006.01)
*F02F 1/42* (2006.01)
*F02F 1/24* (2006.01)

(52) U.S. Cl.
CPC ......... *F01N 13/1811* (2013.01); *F02B 67/10* (2013.01); *F02F 1/243* (2013.01); *F02F 1/40* (2013.01); *F02F 1/4264* (2013.01); *F01N 2260/10* (2013.01); *F02F 2001/4278* (2013.01); *H05K 999/99* (2013.01); *Y02T 10/144* (2013.01)

(58) Field of Classification Search
USPC ....................................................... 60/605.1
See application file for complete search history.

(56) References Cited

U.S. PATENT DOCUMENTS

| | | | | |
|---|---|---|---|---|
| 2012/0192557 A1* | 8/2012 | Johnson | ............... | F01D 17/105 60/599 |
| 2012/0312002 A1* | 12/2012 | Kuhlbach | ............... | F01N 13/10 60/323 |
| 2013/0047605 A1* | 2/2013 | Drangel | ............... | F02B 39/005 60/605.1 |
| 2013/0055713 A1* | 3/2013 | Drangel | ............... | F01N 13/10 60/605.1 |
| 2013/0055971 A1* | 3/2013 | Brewer | ............... | F02F 1/24 123/41.82 R |
| 2013/0086891 A1* | 4/2013 | Ko | ............... | F01N 13/10 60/278 |
| 2013/0291540 A1* | 11/2013 | Serres | ............... | F01D 9/02 60/605.1 |
| 2013/0291811 A1* | 11/2013 | Kuhlbach | ............... | F02F 1/243 123/41.72 |
| 2015/0211383 A1* | 7/2015 | Kuhlbach | ............... | F01D 25/145 60/605.1 |
| 2015/0361873 A1* | 12/2015 | Matsui | ............... | F02B 37/18 60/598 |
| 2016/0061149 A1* | 3/2016 | Moran | ............... | F02F 1/243 123/568.13 |
| 2016/0153339 A1* | 6/2016 | Chu | ............... | F01N 13/16 60/322 |

FOREIGN PATENT DOCUMENTS

| | | |
|---|---|---|
| JP | S62-98720 U | 6/1987 |
| JP | 2010-180745 A | 8/2010 |
| JP | 2013-189921 A | 9/2013 |

* cited by examiner

INTERNAL COMBUSTION ENGINE

BACKGROUND OF THE INVENTION

1. Field of the Invention

The invention relates to an internal combustion engine.

2. Description of Related Art

In an internal combustion engine, a wall that defines an exhaust passage is exposed to high-temperature exhaust gas. As the temperature of the wall increases due to exposure of the wall to high-temperature exhaust gas, the strength of the wall decreases. In order to reduce generation of, for example, cracks due to a decrease in the strength of the wall, configurations for reinforcing the wall that defines the exhaust passage have been proposed.

For example, Japanese Patent Application Publication No. 2013-189921 (JP 2013-189921 A) describes a turbocharger including a turbine housing formed integrally with an exhaust manifold. In such a turbocharger, the temperature of a continuous portion extending from a collector of the exhaust manifold to a portion that defines a turbine scroll passage, that is, an inlet port of the turbocharger, is likely to become particularly high. Thus, in the turbocharger according to JP 2013-189921 A, in order to reduce strain due to the thermal expansion of the inlet port which is likely to be heated to a high temperature, the rigidity of the inlet port is increased by providing an outer wall of the inlet port with a reinforcing portion that extends continuously from the turbine housing to the exhaust manifold.

The reinforcing portion described in JP 2013-189921 A is provided on the outer wall so as to extend continuously from the turbine housing to the exhaust manifold. As a result, in the turbocharger according to JP 2013-189921 A, the rigidity of the inlet port is uniformly increased.

SUMMARY OF THE INVENTION

A turbocharger is disposed between a cylinder head and a peripheral member such as a catalytic converter that is disposed downstream of the turbocharger in the direction of exhaust gas flow and is connected to the turbocharger. Thus, if the rigidity of an inlet port of the turbocharger is increased uniformly, the strain in the inlet port itself due to the thermal expansion of the inlet port is reduced. However, the influence of elongation of the inlet port due to the thermal expansion is easily exerted on the peripheral member, resulting in larger strain in the peripheral member. The invention provides an internal combustion engine configured to achieve both ensuring of sufficient strength of an inlet port of a turbocharger, which is heated to a high temperature by exhaust gas, and protection of a peripheral member connected to the turbocharger.

An internal combustion engine according to an aspect of the invention includes a cylinder block, a cylinder head, and a turbocharger. The cylinder block includes a plurality of cylinders. The cylinder head includes an in-head manifold and an in-head coolant passage. The in-head manifold connects to each of combustion chambers of the cylinders. The in-head manifold is configured to collect exhaust gases from the combustion chambers. The in-head manifold connects to an exhaust outlet of the cylinder head. The central axis of the exhaust outlet is located, in the cylinder array direction of the cylinders, closer to one cylinder out of the two outermost cylinders than the center of a straight line connecting central axes of the two outermost cylinders to each other. The cylinder array direction is a direction of extension of a straight line that passes through central axes of the cylinders on a plane orthogonal to the central axes of the cylinders. The turbocharger includes an inlet port. The inlet port connects to the exhaust outlet of the cylinder head. The inlet port includes a first wall portion and a second wall portion. The first wall portion is located between the one cylinder and the central axis of the inlet port in the cylinder array direction. The second wall portion is located on the opposite side of the central axis of the inlet port from the first wall portion. The first wall portion includes a thick-walled portion and a thin-walled portion. The thick-walled portion is greater in pipe wall thickness than the second wall portion. The thin-walled portion is smaller in pipe wall thickness than the thick-walled portion. The thin-walled portion is located upstream of the thick-walled portion in a direction of exhaust gas flow.

According to the above-described aspect, the central axis of the exhaust outlet of the cylinder head is located on one side of the center of the straight line connecting the central axes of the two outermost cylinders to each other, in the cylinder array direction. Thus, branch pipes connecting to a collector of the in-head manifold vary in tilt angle from each other, and thus the entry angles of the exhaust gases that enter the inlet port from the branch pipes vary among the branch pipes.

The exhaust gas introduced into the inlet port from the branch pipe, which extends from the cylinder that is farther from the exhaust outlet out of the two outermost cylinders in the cylinder array direction, impinges on the wall of the inlet port at an angle that is closer to the right angle than the angles at which the exhaust gases introduced into the inlet port from the other branch pipes impinge on the wall of the inlet port. As a result, the portion, on which the exhaust gas introduced into the inlet port from this branch pipe impinges, is likely to be heated to a particularly high temperature.

In contrast to this, according to the above-described aspect, the thick-walled portion is provided in the first wall portion of the inlet port, which is located on the opposite side of the central axis of the inlet port from the cylinder that is farther from the exhaust outlet out of the two outermost cylinders in the cylinder array direction. Thus, the portion that is likely to be heated to a particularly high temperature is reinforced. Further, the thin-walled portion that is thinner than the thick-walled portion is provided in the first wall portion, at a position upstream of the thick-walled portion in the direction of exhaust gas flow. Thus, stress due to the thermal expansion of the inlet port is concentrated on the thin-walled portion having a lower rigidity. That is, unlike in the case where the entirety of the first wall portion is reinforced, the strain due to the stress is concentrated on the thin-walled portion, so that the strain due to the thermal expansion of the inlet port is absorbed inside the inlet port. Thus, it is possible to reduce generation of strain due to the thermal expansion of the inlet port in a peripheral member connected to the turbocharger.

In the above-described aspect, the cylinder head is cooled by coolant that circulates through the in-head coolant passage. Thus, the temperature of a portion of the inlet port close to the cylinder head side, namely, a portion of the inlet port located on the upstream side in the direction of exhaust gas flow is less likely to be increased. Because the thin-walled portion is provided upstream of the thick-walled portion in the direction of exhaust gas flow, the thin-walled portion is less likely to be heated to a high temperature than the thick-walled portion. The thin-walled portion is less likely to decrease in strength despite the small pipe thickness of the thin-walled portion.

That is, according to the above-described aspect, the portion, which is likely to be heated to a high temperature and is thus likely to decrease in strength, is formed of the thick-walled portion to be reinforced, while the portion, which is less likely to be heated to a high temperature and is thus less likely to decrease in strength, is formed of the thin-walled portion so that the strain due to the thermal expansion of the inlet port is concentrated on the thin-walled portion to be absorbed. Thus, it is possible to achieve both ensuring of sufficient strength of the inlet port of the turbocharger, which is heated to a high temperature by exhaust gas, and protection of the peripheral member connected to the turbocharger.

In the above-described aspect, the inlet port may include a flange. The inlet port may be configured to be connected at the flange to the cylinder head. The thin-walled portion may be located adjacent to the flange, at a position downstream of the flange in the direction of exhaust gas flow.

According to the above-described configuration, the thin-walled portion is provided near the cylinder head that is cooled by the circulating coolant. Thus, the temperature of the thin-walled portion decreases, so that a decrease in strength of the thin-walled portion is further inhibited.

In the above-described aspect, a wall portion of the inlet port located between the thin-walled portion and the thick-walled portion may be gradually increased in pipe wall thickness from the thin-walled portion to the thick-walled portion until the pipe wall thickness of the wall portion becomes equal to the pipe wall thickness of the thick-walled portion.

If there is a steep change in the pipe wall thickness of the inlet port between the thin-walled portion and the thick-walled portion, stress may be concentrated on a portion where the pipe wall thickness steeply changes. According to above-described configuration, the pipe wall thickness of the inlet port gradually changes between the thin-walled portion and the thick-walled portion, stress is less likely to be concentrated on the portion between the thin-walled portion and the thick-walled portion.

In the above-described aspect, the pipe wall thickness of the inlet port may be greatest at the thick-walled portion in a cross-section of the inlet port, the cross-section being orthogonal to the central axis of the inlet port. In the above-described aspect, in the inlet port, the pipe wall thickness of the thick-walled portion is greater than that of the other portion, and thus an excessive increase in rigidity of the inlet port is avoided. Thus, it is possible to effectively inhibit the stress due to the thermal expansion of the inlet port from acting on the peripheral member connected to the turbine housing.

In the above-described aspect, the pipe wall thickness of the inlet port may be smallest at the thin-walled portion in a cross-section of the inlet port, the cross-section being orthogonal to the central axis of the inlet port. That is, stress due to the thermal expansion is more likely to be concentrated on the thin-walled portion. As a result, strain in the inlet port is more likely to be concentrated on the thin-walled portion, and strain is further less likely to be generated in the portions of the inlet port other than the thin-walled portion. Consequently, it is possible to inhibit deformation of the portion that is likely to be heated to a high temperature and is thus likely to decrease in strength.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
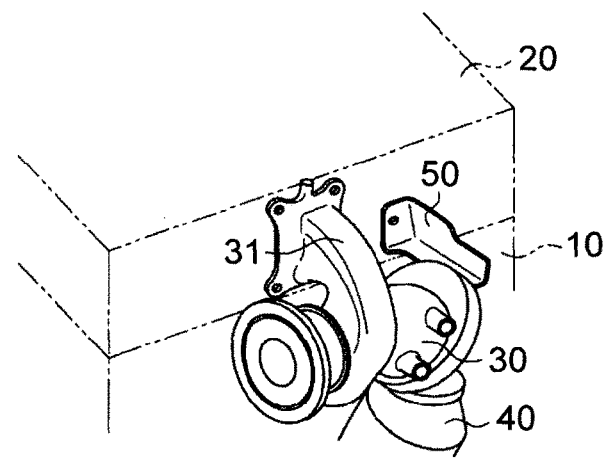
FIG. 1 is a schematic view illustrating the configuration around a turbocharger that is assembled to a cylinder head of an internal combustion engine according to an embodiment of the invention.

Hereinafter, an internal combustion engine according to an embodiment of the invention will be described with reference to FIG. 1 to FIG. 5. The internal combustion engine according to the present embodiment includes a turbocharger. As illustrated in FIG. 1, in the internal combustion engine, a cylinder head 20 is assembled to a cylinder block 10, and an inlet port 31 of a turbine housing 30 of the turbocharger is connected to the cylinder head 20. Thus, exhaust gases discharged from a plurality of cylinders of the cylinder block 10 is introduced through the inlet port 31 into the turbine housing 30. A catalytic converter 40 is disposed downstream of the turbine housing 30 in the direction of exhaust gas flow, and is connected to the turbine housing 30. In the internal combustion engine, a stay 50 is disposed between the turbine housing 30 and the cylinder head 20, and the stay 50 assists supporting of the turbine housing 30.

Figure 2:
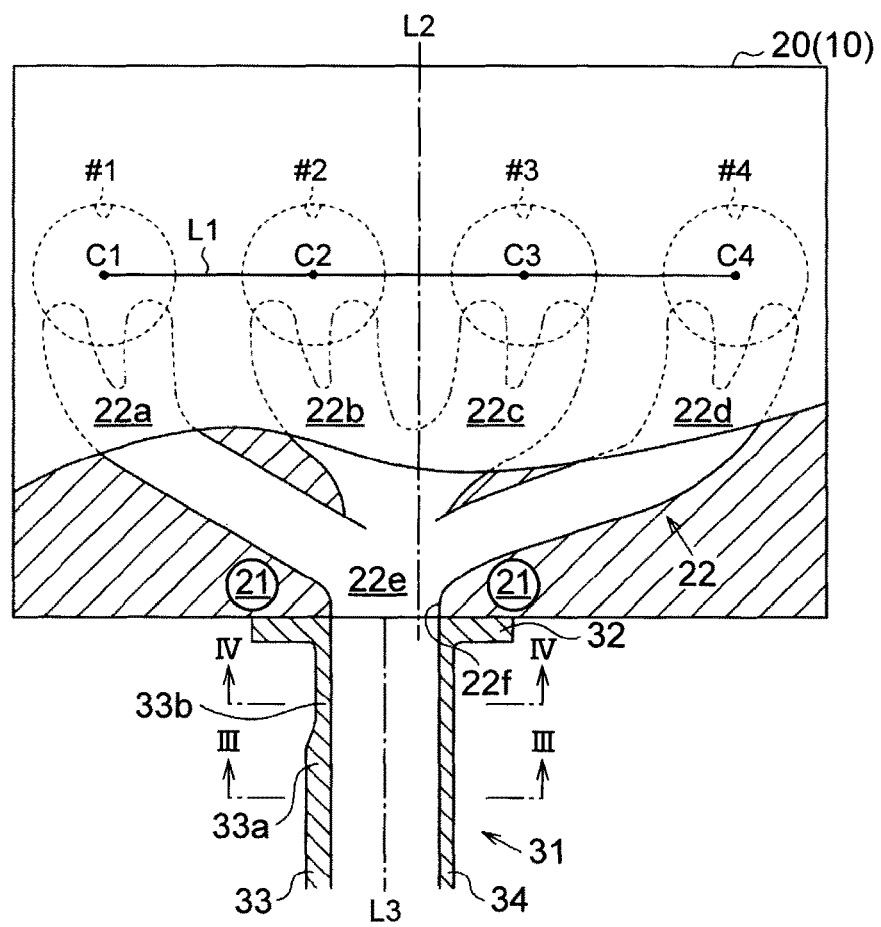
FIG. 2 is a partial sectional view of the cylinder head and an inlet port according to the embodiment.

As illustrated in FIG. 2, the internal combustion engine according to the present embodiment is an in-line four-cylinder internal combustion engine, and the cylinder block 10 includes cylinders #1, #2, #3, #4. The cylinder head 20 includes an in-head manifold 22 that is connected to combustion chambers of the cylinders #1, #2, #3, #4 to collect exhaust gases from the cylinders #1, #2, #3, #4. The in-head manifold 22 includes branch pipes 22a, 22b, 22c, 22d extending respectively from the cylinders #1, #2, #3, #4, and a collector 22e that collects the exhaust gases passed through the branch pipes 22a to 22d. An exhaust outlet 22f, through which the collected exhaust gas is discharged, is opened on a side surface of the cylinder head 20.

An inlet port 31 of the turbine housing 30 is connected to a portion of the side surface of the cylinder head 20, where the exhaust outlet 22f is open. Thus, the exhaust gas discharged from the cylinder head 20 through the in-head manifold 22 is introduced into the turbocharger through the inlet port 31.

An in-head coolant passage 21, through which coolant is circulated in the cylinder head 20, is provided around the in-head manifold 22 of the cylinder head 20. Next, the in-head manifold 22 will be described in detail.

As illustrated in FIG. 2, the direction of extension of a straight line L1 that passes through central axes C1, C2, C3, C4 of the cylinders #1, #2, #3, #4 on a plane orthogonal to the central axes C1, C2, C3, C4 will be referred to as a cylinder array direction. Further, a straight line that passes through the midpoint between the central axis C1 and the central axis C4 and that is orthogonal to the straight line L1 will be referred to as a straight line L2.

The exhaust outlet 22*f* of the in-head manifold 22 is provided at such a position that the central axis of the exhaust outlet 22*f* is located between the cylinder #1 and the straight line L2 in the cylinder array direction (i.e., the distance between the central axis of the exhaust outlet 22*f* and the cylinder #1 is shorter than the distance between the straight line L2 and the cylinder #1 in the cylinder array direction), so that the exhaust outlet 22*f* is closer to the cylinder #1 than to the cylinder #4. The cylinders #1, #4 are outermost cylinders in the cylinder array direction. Because the exhaust outlet 22*f* is provided at such a position that the central axis of the exhaust outlet 22*f* is located between the cylinder #1 and the straight line L2 in the cylinder array direction, the branch pipes 22*a* to 22*d* extending respectively from the cylinders #1 to #4 to the collector 22*e* vary in tilt angle from each other. More specifically, the branch pipe 22*d* extending from the cylinder #4, which is the cylinder farthest from the exhaust outlet 22*f*, is tilted such that the entry angle of the exhaust gas that enters the inlet port 31 from the branch pipe 22*d* is the largest entry angle of all the entry angles of the exhaust gases that enter the inlet port 31 from the branch pipes 22*a* to 22*d*.

Next, the inlet port 31 will be described in detail. As described above, the inlet port 31 is connected to the cylinder head 20 at a flange 32, which is provided at the distal end of the inlet port 31, so as to be communicated with the exhaust outlet 22*f*. Thus, the inlet port 31 is provided on the cylinder #1 side in the cylinder array direction. As illustrated in FIG. 2, a central axis L3 of the inlet port 31 is located between the cylinder #1 and the straight line L2 in the cylinder array direction (i.e., the distance between the central axis L3 of the inlet port 31 and the cylinder #1 is shorter than the distance between the straight line L2 and the cylinder #1 in the cylinder array direction).

Figure 3:
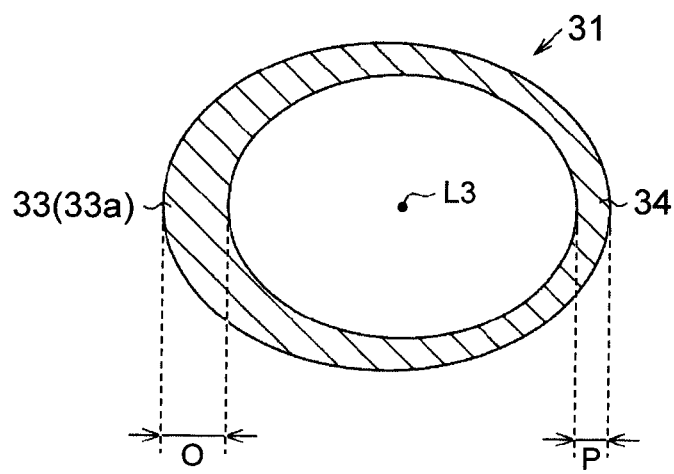
FIG. 3 is a sectional view illustrating the cross-section structure of the inlet port taken along the line in FIG. 2.

A first wall portion 33 of the inlet port 31 includes a thick-walled portion 33*a*. The first wall portion 33 is located between the cylinder #1 and the central axis L3 in the cylinder array direction (i.e., the distance between the first wall portion 33 and the cylinder #1 is shorter than the distance between the central axis L3 and the cylinder #1 in the cylinder array direction). As illustrated in FIG. 3, a wall thickness O of the thick-walled portion 33*a* is greater than a wall thickness P of a second wall portion 34 that is located on the opposite side of the central axis L3 from the first wall portion 33.

As illustrated in FIG. 2, a thin-walled portion 33*b*, which is thinner than the thick-walled portion 33*a*, is provided in a portion of the first wall portion 33, which is located upstream of the thick-walled portion 33*a* in the direction of exhaust gas flow. The thin-walled portion 33*b* is provided adjacent to the flange 32.

Figure 4:
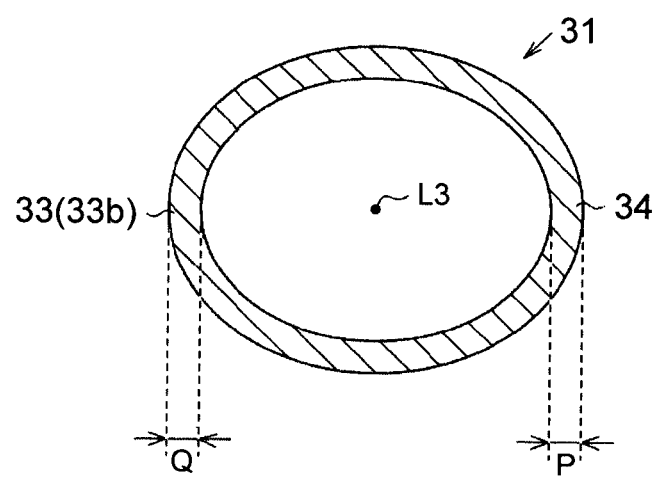
FIG. 4 is a sectional view illustrating the cross-section structure of the inlet port taken along the line IV-IV in FIG. 2.

In a cross-section illustrated in FIG. 4, the wall thickness of the inlet port 31 is substantially uniform along the entire circumference. As illustrated in FIG. 4, a wall thickness Q of the thin-walled portion 33*b* is substantially equal to the wall thickness P of the second wall portion 34.

That is, the pipe wall thickness of the inlet port 31 is greatest at the thick-walled portion 33*a*. As illustrated in FIG. 2, a wall portion of the first wall portion 33, which is located between the thin-walled portion 33*b* and the thick-walled portion 33*a*, is gradually increased in thickness from the thin-walled portion 33*b* to the thick-walled portion 33*a* until the thickness of the wall portion becomes equal to the wall thickness of the thick-walled portion 33*a*.

Figure 5:
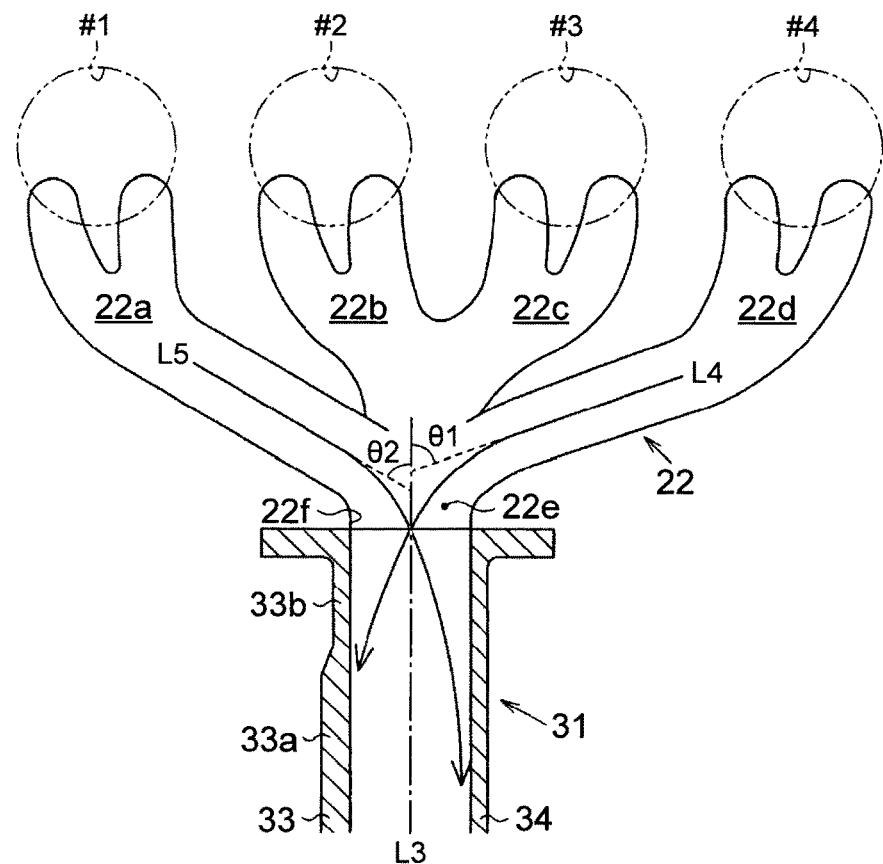
FIG. 5 is a schematic view illustrating exhaust gas flows in an in-head manifold and the inlet port according to the embodiment.

Next, the operation of the internal combustion engine according to the present embodiment will be described with reference to FIG. 5. The exhaust gases discharged from the combustion chambers of the cylinders #1 to #4 pass through the branch pipes 22*a* to 22*d* extending respectively from the cylinders #1 to #4 to be collected in the collector 22*e*. Then, the collected exhaust gas passes through the exhaust outlet 22*f*, flows into the inlet port 31, and is then introduced into the turbine housing 30.

The entry angles of the exhaust gases that enter the inlet port 31 from the branch pipes 22*a* to 22*d* tend to be set such that the entry angle of the exhaust gas, which enters the inlet port 31 from a branch pipe extending from a cylinder that is farther from the exhaust outlet 22*f* in the cylinder array direction, is larger. In the present embodiment, because the cylinder #4 is farthest from the exhaust outlet 22*f*, an angle θ1 between a central axis L4 of the branch pipe 22*d* extending from the cylinder #4 and the central axis L3 of the inlet port 31 is larger than an angle θ2 between a central axis L5 of the branch pipe 22*a* and the central axis L3 of the inlet port 31.

That is, the entry angle of the exhaust gas that enters the collector 22*e* from the branch pipe 22*d* extending from the cylinder #4 is larger than any of the entry angles of the exhaust gases that enter the collector 22*e* from the other branch pipes 22*a* to 22*c*. Thus, the exhaust gas introduced into the inlet port 31 from the branch pipe 22*d* impinges on the wall of the inlet port 31 at an angle that is closer to the right angle than the angles at which the exhaust gases introduced into the inlet port 31 from the other branch pipes 22*a* to 22*c* impinge on the wall of the inlet port 31. As the angle at which the exhaust gas impinges on the wall is closer to the right angle, the temperature of the wall on which the exhaust gas impinges is likely to be higher.

In this respect, in the internal combustion engine according to the present embodiment, the first wall portion 33 of the inlet port 31 is reinforced by providing the thick-walled portion 33*a* at the first wall portion 33 on which the exhaust gas flowing into the inlet port 31 from the branch pipe 22*d* impinges. This reinforcement enhances the rigidity of the inlet port 31 at the thick-walled portion 33*a*.

The position of the thick-walled portion 33*a* in the direction of extension of the central axis L3 is set at a position at which the temperature of the wall is likely to be highest on the basis of the result of simulation conducted in advance. When the inlet port 31 is reinforced by increasing the thickness of the wall thereof, it is possible to reduce strain in the inlet port 31 itself due to the thermal expansion of the inlet port 31. As a result, however, the influence of elongation of the inlet port 31 due to the thermal expansion is easily exerted on a peripheral member connected to the turbine housing 30, such as the catalytic converter 40, resulting in larger strain in the peripheral member.

Further, in the internal combustion engine according to the present embodiment, supporting of the turbine housing 30 onto the cylinder head 20 is assisted by the stay 50. That is, the turbine housing 30 is secured to the cylinder head 20. This reduces changes in positions of the turbine housing 30 and the catalytic converter 40 or the like, which is disposed downstream of the turbine housing 30 in the direction of exhaust gas flow, due to stress generated by the thermal expansion of the inlet port 31. However, due to the interaction between the force, with which the stay 50 supports the turbine housing 30 onto the cylinder head 20, and the stress generated by the thermal expansion, strain exerted on the peripheral member near the turbine housing 30 becomes larger.

In order to avoid such a situation, in the internal combustion engine according to the present embodiment, the thin-walled portion 33b is provided in the inlet port 31, at a position upstream of the thick-walled portion 33a in the direction of exhaust gas flow. Because the rigidity of the thin-walled portion 33b is lower than that of the thick-walled portion 33a, the stress generated by the thermal expansion of the inlet port 31 is concentrated on the thin-walled portion 33b. Thus, the strain due to the stress is concentrated on the thin-walled portion 33b, so that the strain due to the thermal expansion of the inlet port 31 is absorbed within the inlet port 31. That is, it is possible to reduce the generation of strain due to the thermal expansion of the inlet port 30, in the catalytic converter 40 or the like disposed downstream of the turbine housing 30 in the direction of exhaust gas flow and connected to the turbine housing 30.

The embodiment described above produces the following effects (1) to (6). (1) The thick-walled portion 33a is provided in the first wall portion 33 of the inlet port 31, which is located on the opposite side of the central axis L3 of the inlet port 31 from the cylinder #4 that is farther from the exhaust outlet 22f in the cylinder array direction. Thus, the portion that is likely to be heated to a particularly high temperature is reinforced.

(2) The thin-walled portion 33b that is thinner than the thick-walled portion 33a is provided in the first wall portion 33, at a position upstream of the thick-walled portion 33a in the direction of exhaust gas flow. Thus, the stress due to the thermal expansion of the inlet port 31 is concentrated on the thin-walled portion 33b having a lower rigidity. That is, the strain due to the stress is concentrated on the thin-walled portion 33b, so that the strain due to the thermal expansion of the inlet port 31 is absorbed within the inlet port 31. That is, it is possible to reduce the generation of strain due to the thermal expansion of the inlet port 30, in the peripheral member connected to the turbine housing 30.

(3) The cylinder head 20 is cooled by the coolant circulating through the in-head coolant passage 21. Thus, the thin-walled portion 33b, which is provided upstream of the thick-walled portion 33a in the direction of exhaust gas flow, namely, provided near the cylinder head 20, is less likely to be heated than the thick-walled portion 33a. Therefore, the strength of the thin-walled portion 33b is less likely to be decreased despite the small pipe wall thickness of the thin-walled portion 33b.

That is, in synergy with the above-described effects (1), (2), the portion, which is likely to be heated to a high temperature and is thus likely to decrease in strength, is formed of the thick-walled portion 33a to be reinforced, while the portion, which is less likely to be heated to a high temperature and is thus less likely to decrease in strength, is formed of the thin-walled portion 33b so that the strain due to the thermal expansion of the inlet port 31 is concentrated on the thin-walled portion 33b to be absorbed. Thus, it is possible to achieve both ensuring of sufficient strength of the inlet port 11 of the turbine housing 30, which is heated to a high temperature by exhaust gas, and protection of the peripheral member connected to the turbine housing 30.

(4) In the present embodiment, the thin-walled portion 33b is provided adjacent to the flange 32, and thus the thin-walled portion 33b is disposed near the cylinder head 20 that is cooled by the circulating coolant. As a result, an increase in the temperature of the thin-walled portion 33b is further inhibited and a decrease in the strength of the thin-walled portion 33b is inhibited.

(5) If there is a steep change in the pipe wall thickness of the inlet port 31 between the thin-walled portion 33b and the thick-walled portion 33a, stress may be concentrated on a portion where the pipe wall thickness steeply changes. According to the present embodiment, the pipe wall thickness of the inlet port 31 gradually changes between the thin-walled portion 33b and the thick-walled portion 33a, stress is less likely to be concentrated on the portion between the thin-walled portion 33b and the thick-walled portion 33a.

(6) In the inlet port 31, the pipe wall thickness of the thick-walled portion 33a is greater than that of the other portion, and thus an excessive increase in rigidity of the inlet port 31 is avoided. Thus, it is possible to effectively inhibit the stress due to the thermal expansion of the inlet port 31 from acting on the peripheral member connected to the turbine housing 30.

The above-described embodiment may be modified as follows. In the above-described embodiment, the stay 50 used to support the turbine housing 30 onto the cylinder head 20 is provided. However, even if the stay 50 is not provided, the turbine housing 30 is secured by the cylinder head 20 and the catalytic converter 40. Therefore, regardless of whether or not the stay 50 is provided, there is a possibility that strain due to the thermal expansion of the inlet port 31 will exert influence on the peripheral member connected to the turbine housing 30. That is, the same inconvenience may occur even in an internal combustion engine provided with no stay 50. It is possible to produce the same effects as described above by adopting the configuration according to the above-described embodiment.

In the above-described embodiment, the second wall portion 34 has a constant wall thickness. However, the wall thickness of the second wall portion 34 need not be constant. However, forming the second wall portion 34 to be thinner than the thin-walled portion 33b of the first wall portion 33 should be avoided.

Figure 6:
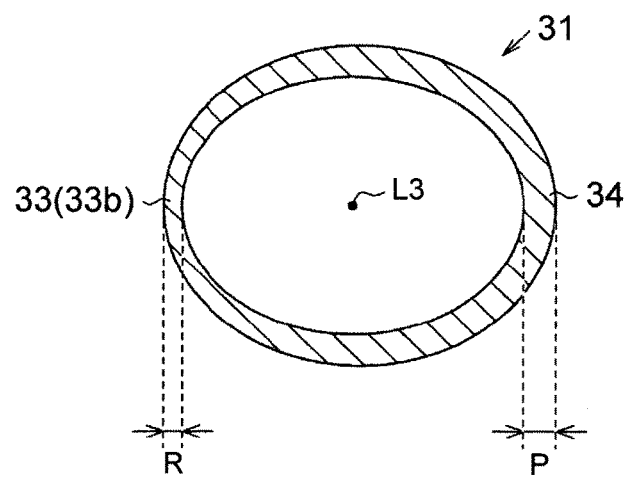
FIG. 6 is a sectional view of an inlet port of an internal combustion engine according to a modified example of the embodiment.

In the above-described embodiment, the wall thickness Q of the thin-walled portion 33b is substantially equal to the wall thickness P of the second wall portion 34. However, the wall thickness of the thin-walled portion 33b need not be substantially equal to the wall thickness of the second wall portion 34. For example, as illustrated in FIG. 6, the thin-walled portion 33b having a wall thickness smaller than the second wall portion 34 may be provided by setting a wall thickness R of the thin-walled portion 33b to be smaller than the wall thickness P of the second wall portion 34. When such a configuration is applied to the above-described embodiment, the pipe wall thickness of the inlet port 31 is smallest at the thin-walled portion 33b. That is, stress due to the thermal expansion is more likely to be concentrated on the thin-walled portion 33b. As a result, strain in the inlet port 31 is more likely to be concentrated on the thin-walled portion 33b, and strain is further less likely to be generated in the portions of the inlet port 31 other than the thin-walled portion 33b. Consequently, it is possible to inhibit deformation of the portion that is likely to be heated to a high temperature and is thus likely to decrease in strength.

In the above description, the configuration according to the above-described embodiment is applied to the in-line four-cylinder internal combustion engine. However, internal combustion engines to which the configuration according to the above-described embodiment is applicable are not limited to an in-line four-cylinder internal combustion engine. When the exhaust outlet 22f of the in-head manifold 22 is provided at such a position that the exhaust outlet 22f is closer to one of the two outermost cylinders than to the other one of the two outermost cylinders in the cylinder array direction, it is possible to produce the same effects as those in the above-described embodiment.

In the above-described embodiment, the exhaust outlet 22f is provided such that the central axis of the exhaust outlet 22f is located between the cylinder #1 and the straight line L2 in the cylinder array direction. However, the exhaust outlet 22f may be provided such that the central axis of the exhaust outlet 22f is between the cylinder #4 and the straight line L2 in the cylinder array direction. In this case, the entry angle of the exhaust gas flowing into the inlet port 31 from the branch pipe 22a extending from the cylinder #1 is the largest entry angle of all the entry angles of the exhaust gases that enter the inlet port 31 from the branch pipes 22a to 22d. That is, when such a configuration is applied to the above-described embodiment, the same effects as those in the above-described embodiment are produced by providing the thin-walled portion 33b and the thick-walled portion 33a in the second wall portion 34 of the inlet port 31, which is located between the cylinder #4 and the central axis L3.

The configuration according to the above-described embodiment may be applied to an internal combustion engine provided with a twin scroll turbocharger. In this case, the inlet port is provided with two separate exhaust passages. The same effects as those in the above-described embodiment are produced by providing a thick-walled portion and a thin-walled portion in a wall portion located on the side on which the exhaust outlet 22f of the in-head manifold 22 is offset with respect to the straight line L2.

What is claimed is:

1. An internal combustion engine comprising:
   a cylinder block including a plurality of cylinders each defining a combustion chamber and arranged in a cylinder array direction;
   a cylinder head including an in-head manifold and an in-head coolant passage, the in-head manifold connecting to each of the combustion chambers of the plurality of cylinders, the in-head manifold configured to collect exhaust gases from the combustion chambers, and the in-head manifold connecting to an exhaust outlet of the cylinder head, a central axis of the exhaust outlet being located, in the cylinder array direction, closer to one cylinder of two outermost cylinders of the plurality of cylinders than a center of a straight line connecting central axes of the two outermost cylinders of the plurality of cylinders to each other, and the cylinder array direction being a direction of extension of a straight line that passes through central axes of each cylinder of the plurality of cylinders on a plane orthogonal to the central axes of the cylinders; and
   a turbocharger including an inlet port, the inlet port connecting to the exhaust outlet of the cylinder head, the inlet port including a first wall portion and a second wall portion, the first wall portion being located between the one cylinder of the two outermost cylinders of the plurality of cylinders and a central axis of the inlet port in the cylinder array direction, the second wall portion being located on an opposite side of the central axis of the inlet port from the first wall portion, the first wall portion including a thick-walled portion and a thin-walled portion, the thick-walled portion being greater in wall thickness than the second wall portion, the thin-walled portion being smaller in wall thickness than the thick-walled portion, and the thin-walled portion being located upstream of the thick-walled portion in a direction of exhaust gas flow.

2. The internal combustion engine according to claim 1, wherein:
   the inlet port includes a flange;
   the inlet port is connected at the flange to the cylinder head; and
   the thin-walled portion is located adjacent to the flange, at a position downstream of the flange in the direction of exhaust gas flow.

3. The internal combustion engine according to claim 1, wherein a wall portion of the inlet port located between the thin-walled portion and the thick-walled portion is gradually increased in wall thickness from the thin-walled portion to the thick-walled portion until a wall thickness of the wall portion becomes equal to a wall thickness of the thick-walled portion.

4. The internal combustion engine according to claim 1, wherein a wall thickness of the inlet port is greatest at the thick-walled portion in a cross-section of the inlet port, the cross-section being orthogonal to the central axis of the inlet port.

5. The internal combustion engine according to claim 1, wherein a wall thickness of the inlet port is smallest at the thin-walled portion in a cross-section of the inlet port, the cross-section being orthogonal to the central axis of the inlet port.

* * * * *